United States Patent

[11] 3,567,002

[72] Inventor Raymond W. Russ
 30 S. Jasmine St., Denver, Colo. 80222
[21] Appl. No. 815,241
[22] Filed Mar. 12, 1969
[45] Patented Mar. 2, 1971

[54] LOAD TRANSFER DEVICES FOR CONVEYORS
 3 Claims, 7 Drawing Figs.
[52] U.S. Cl. ................................................. 198/25,
 198/32, 198/127, 193/37
[51] Int. Cl. ........................................................ B65g 47/00,
 B65g 47/26
[50] Field of Search .......................................... 193/37;
 198/25, 127, 32

[56] References Cited
 UNITED STATES PATENTS
 3,225,893  12/1965  Currie ............................ 198/127

3,080,043  3/1963  Johansen ....................  198/32

FOREIGN PATENTS
 914,957  6/1954  Germany ....................  193/37
 1,008,650  5/1957  Germany ....................  193/37

Primary Examiner—Richard E. Aegerter
Attorney—R. H. Galbreath

ABSTRACT: Two similar, closely adjacent turntables independently mounted in the travel plane of a main roller conveyor. Each turntable being provided with a plurality of parallel, power driven table rollers lying in the plane of the rollers of the main roller conveyor. The turntables being independently rotatable so that the table rollers can be directed in any desired direction so as to direct loads from the main conveyor onto intersecting side roller conveyors or from the side conveyors onto the main conveyor in either direction.

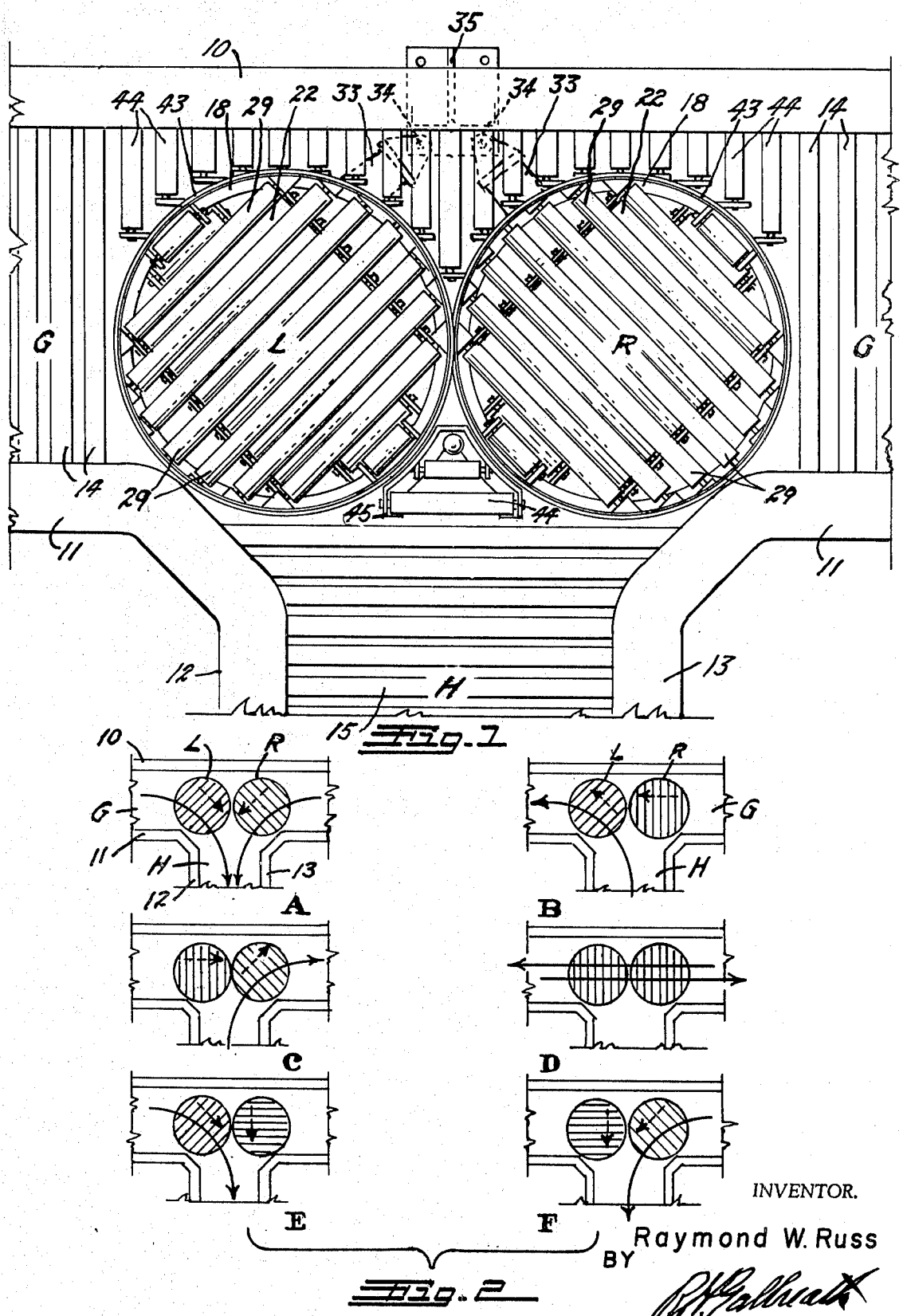

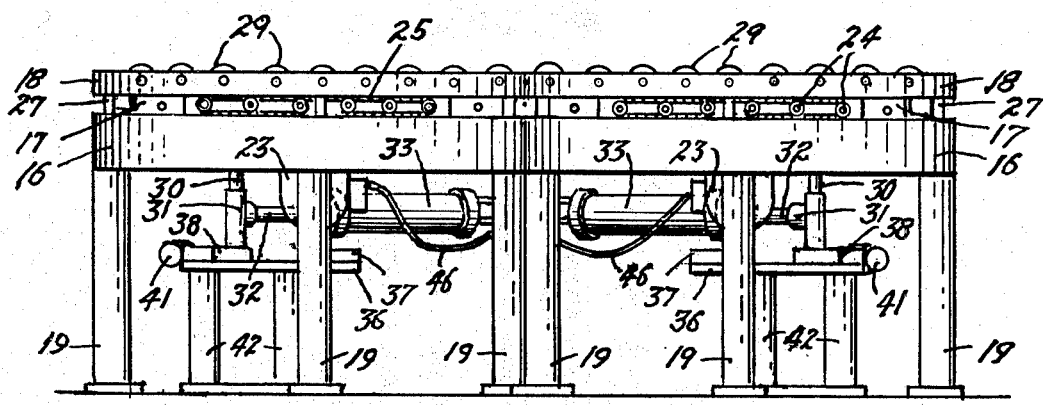
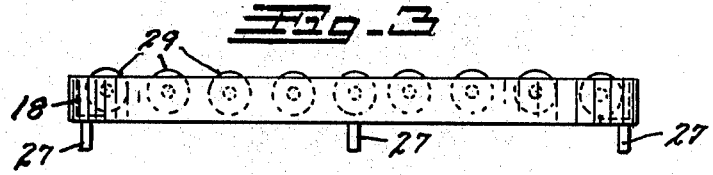
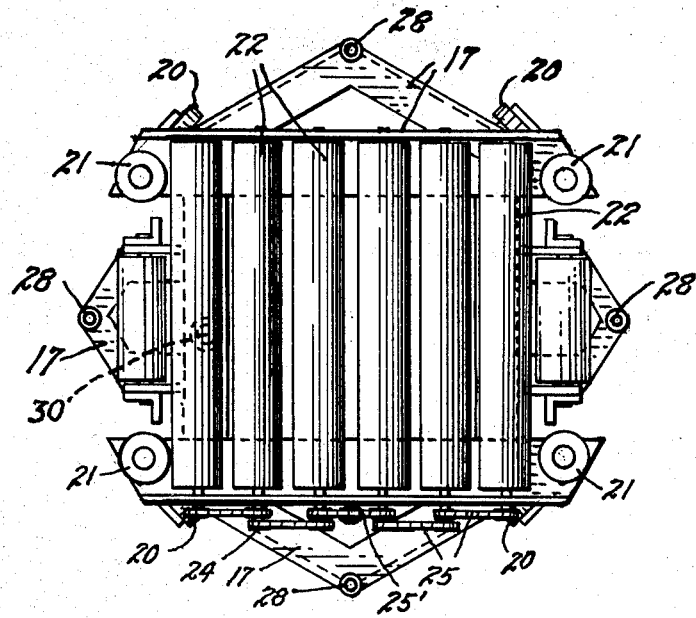

PATENTED MAR 2 1971

INVENTOR.
Raymond W. Russ
BY
ATTORNEY

LOAD TRANSFER DEVICES FOR CONVEYORS

The invention is designed for use in establishments where exceedingly heavy articles are conveyed about a plant upon roller conveyors. It is especially valuable in newspaper plants where vertically positioned rolls of newsprint weighing approximately 2,000 lbs. are transported on roller conveyors from storage to the presses but is not limited to this particular use.

The principal object of the invention is to provide an improved, highly efficient transfer device which can be installed in a main roller conveyor to selectively divert loads to, and receive loads from, lateral conveyors which intersect the main conveyor at desired intervals.

Another object is to provide means in the improved transfer device whereby the diversion of the loads can be efficiently and readily remotely controlled at all of the intervals from a single central station in other conveniently located control devices.

A further object is to provide a transfer device of the above type which will efficiently operate to divert loads regardless of the direction of travel of the loads upon the main conveyor.

Other objects and advantages reside in the detail construction of the invention, which is designed for simplicity, economy, and efficiency. These will become more apparent from the following description.

In the following detailed description of the invention, reference is made to the accompanying drawings which form a part hereof. Like numerals refer to like parts in all views f the drawings and throughout the description.

In the drawing:

FIG. 1 is a plan view of the improved transfer device in place at the intersection of a conventional lateral roller conveyor with a conventional main roller conveyor;

FIG. 2 illustrates diagrammatically at A, B, C, D, E and F six different load flows, indicated by solid arrows, to which the device of FIG. 1 may be adjusted;

FIG. 3 is a front view of the transfer device, per se, as it would appear removed from the conventional main and lateral conveyors;

FIG. 4 is an enlarged detail side elevational view of a load-roller frame employed in the device of FIGS. 1 and 3;

FIG. 5 is a similarly enlarged detail plan view of a drive-roller frame upon which the load-roller frame of FIG. 4 is supported;

Figure 6:
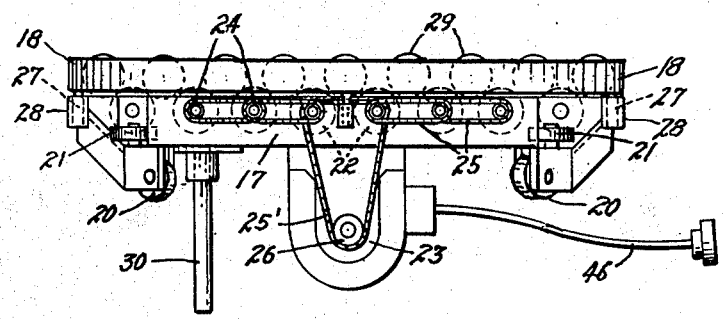
FIG. 6 is a detail side elevational view of the drive-roller frame of FIG. 5, illustrating the load-roller in place thereon.
Figure 7:
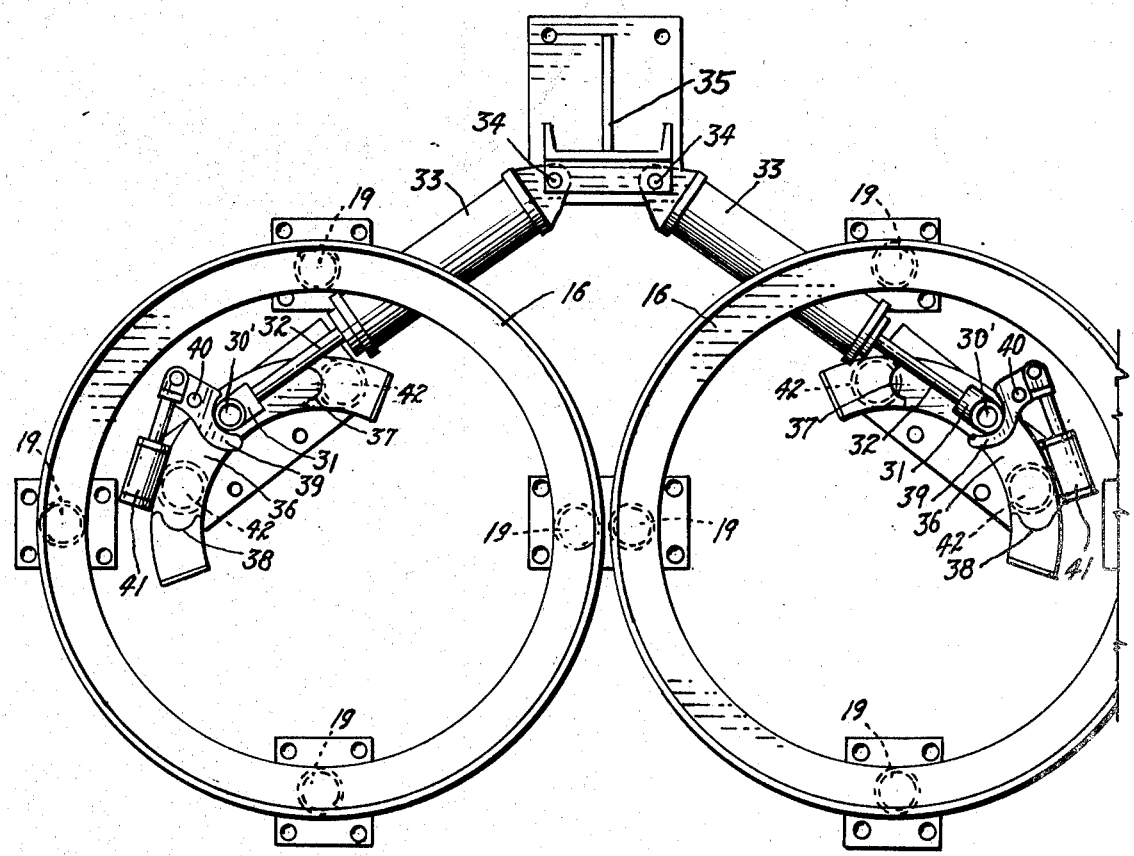
FIG. 7 is a fragmentary detail plan view of a base frame adapted to rotatably support two of the drive-roller frames of FIG. 6 with their superimposed load-roller frames as shown in FIGS. 1 and 3.

In FIGS. 1 and 7, the elements of the transfer device are shown in the position diagrammatically indicated at A, FIG. 2; and in FIGS. 3, 4, 5 and 6, the elements are illustrated as they would appear when in the position diagrammatically indicated at D, FIG. 2.

In FIGS. 1 and 2 the two side rails of a conventional main roller conveyor G are indicated at 10 and 11 and the two side rails of a conventional lateral intersecting conveyor H are indicated at 12 and 13. The rollers of the main conveyor G are indicated at 14 and the rollers of the lateral conveyor H are indicated at 15.

The transfer device of this invention is positioned at the intersection of the lateral conveyor H with the main conveyor G and comprises two similar turntable structures L and R which are positioned in side-by-side relation and in axial alignment with the main conveyor and upon opposite sides of the projected axis of the lateral conveyor H.

Briefly, each turntable structure comprises a stationary, annular track 16, upon which a powered drive roller frame 17 is rotatably mounted, and an annular load roller frame 18 which is positioned upon and supported by the powered roller frame 17 so as to horizontally rotate in unison with the latter.

The track 16 is preferably formed of angle iron with one leg horizontal and the other leg vertical. The horizontal leg is welded on the upper extremities of a plurality of tubular supporting columns 19 which stationarily support the track in a fixed horizontal position to form a base frame for the transfer device.

The powered drive-roller frame 17 is provided with vertical wheel discs 20, which travel on the horizontal leg of the track, and the frame 17 is maintained concentric with the track 16 by means of peripherally-placed, horizontal guide discs 21 which engage the vertical leg of the track 16. A plurality of spaced, parallel, drive rollers 22 are mounted upon he top of the drive-roller frame 17. The drive rollers 22 are power-driven in any desired manner such as by a suitable, reversible, reduction geared electric motor 23 which is attached to and suspended below the powered drive-roller frame 17. A flexible conductor cord 46 feeds current to the motor 23 from any suitable source.

As illustrated, the drive rollers 22 are provided with chain sprockets 24 and the sprockets 24 of adjacent rollers are interconnected by means of sprocket chains 25. The medial sprocket chain, indicated at 25', is extended downwardly round a drive sprocket 26 mounted on the output shaft of the motor 23, as shown in FIGS. 5 and 6. Thus, it can be seen that actuation of the reversible motor 23 in either direction will drive all of the drive roller s 22 of that turntable in the motor direction.

The load-roller frame 18 is axially positioned above the powered drive-roller frame 17 and is maintained concentric therewith by means of dowel pins 27 which extend downwardly from the load-roller frame 18 into pin-receiving sockets 28 in the drive-roller frame 17. A plurality of spaced, parallel load rollers 29 are rotatably mounted on the top of the frame 18 which, when in the operative position, lie in the plane of the conventional conveyor rollers 14 and 15. The spacing of the load rollers 29 is such that, when the load-roller frame 18 is in place upon its respective powered drive-roller frame 17, the rollers 29 will be positioned between and will rest upon and between adjacent drive rollers 22 so as to be frictionally driven by the latter.

It can be seen from the above that the load-roller frame 18 and the drive-roller frame 17 can, due to the dowel pins 27, be rotated as a unit about a vertical axis supported by the wheel discs 20 and guided by the guide discs 21. Therefore, when the two turntable structures are in position in the conveyor, the load-rollers 29 can be positioned relative to the travelling load, as indicated by the long solid arrows in FIG. 2, and rotated, as indicated by the short dotted arrows therein, to direct the load in the desired direction. For instance, when the load-rollers 29 of the two turntable structures are positioned and rotated as shown in diagram A in FIG. 2, the loads approaching the intersection from either or both directions on the main conveyor G will be deflected onto the lateral conveyor H. With the load-rollers 29 positioned, as shown in diagram B, loads approaching the main conveyor from the lateral conveyor will be deflected to the left on the main conveyor and if the load-rollers be positioned, as shown in diagram C, the loads will be deflected to the right on the main conveyor. With the load-rollers positioned, as shown in diagram D, the loads can travel straight in either direction past the intersection, with the load-rollers rotating in the direction of travel, without interference by the lateral conveyor. Loads travelling to the right or the left on the main conveyor may be directed to the lateral conveyor by positioning the load-rollers as shown in diagrams E and F in FIG. 2.

The load-roller frame 18 and the drive-roller frames 17 may be rotated to, and preset in, the above positions in any suitable manner to accommodate the desired load routes.

As illustrated, means are provided for remotely controlling the load routes comprising elongated wrist pins 30 eccentrically affixed to, and extending vertically downward from, each of the drive-roller frames 12. Each of the wrist pins 30 enters a wrist pin bearing 30' in a T-shaped wrist pin head 31 on a piston rod 32 extending from hydraulic cylinder 33. The two hydraulic cylinders 33 are pivotally anchored, as shown at 34, to a stationary vertical anchor post 35 positioned between and rearwardly of the turntables. The heads 31 of the piston rods 32 are positioned above arcuate track plates 36 supported below the track 16 on supporting posts 42. The relation between the wrist pins 30 and the axes of the load rollers 29 is such that when the load rollers are in the transverse position, as shown in diagram D of FIG. 2, the piston rods will be substantially fully extended and when the load-rollers are parallel to the axis of the main conveyor, as shown at the right in diagram E and at the left in diagram F of FIG. 2, the piston rods 32 will be substantially fully retracted. Each of the track plates 36 is provided, adjacent its one extremity, with a fixed extension stop 38 which will be contacted by the head 31 of the adjacent piston rod 32 to stop the extension of the piston rod when the load rollers are in the transverse position of D, FIG. 2. Each of the track plates is also provided, adjacent its other extremity, with a fixed retraction stop 37 which will be contacted by the piston head 31 to stop the load rollers in the conveyor-aligned position as shown at the right and left of diagrams E and F, respectively.

To stop the travel of the piston rods and the rotation of the load rollers 29 at an intermediate position so that the load rollers will be in the 45° angular positions such as shown in FIG. 1 and by diagram A FIG. 2, an intermediate stop 39 is pivotally mounted as shown at 40 on each track plate 36 so as to swing into and out of the path of the head 31. The intermediate stops 39 may be actuated in any desired manner such as by means of solenoids 41, small air cylinders or other conventional actuating devices.

Thus it can be seen that the hydraulic cylinders 33, the solenoids 41 and the motors 23 can be individually controlled from a single suitable central station so as to provide any desired route setting at any of the lateral intersections of a complete conveyor system while the latter is in operation.

The conventional conveyor G can be adapted to receive the turntable structures L and R by installing ring frames 43 therein, of a diameter to rotatably receive the load-roller frames 18, and installing idler rollers 44 between the ring frames 43 and the side rail 10. The interspace between the ring frames 43 and the lateral conveyor rollers 15 can be filled with a suitably contoured idler roller frame 45 also containing idler rollers 44.

While a specific form of the invention has been described and illustrated herein, it is to be understood that the same may be varied within the scope of the appended claims, without departing from the spirit of the invention.

I claim:

1. A load transfer device for directing travelling loads between a main roller conveyor to an intersecting lateral conveyor comprising:
   a. two turntable structures positioned in side-by-side relation in axial alignment with the load path of said main conveyor and upon opposite sides of the projected axis of the lateral conveyor;
   b. an independent annular, horizontally rotatable load-roller frame mounted on each turntable structure;
   c. parallel, spaced, rotatable load-supporting rollers mounted in each load-roller frame in the plane of the rollers of said main conveyor; and
   d. means for independently and horizontally rotating each of said load-roller frames so as to position the axes of the load-supporting rollers thereof at various angles to the axes of the main conveyor rollers to direct the travelling loads in desired directions.

2. A load transfer device as described in claim 1 having power means on each turntable structure for rotating the load-supporting rollers of that structure in either direction independently of the load-supporting rollers of the other turntable structure.

3. A load transfer device as described in claim 2 having stop means on each turntable structure acting to limit the degree of horizontal rotation of the load-roller frame of the respective section independently of the other section.